United States Patent
Soga (10) Patent No.: US 7,456,864 B2
(45) Date of Patent: Nov. 25, 2008

(54) DIGITAL CAMERA FOR CAPTURING A PANORAMIC IMAGE

(75) Inventor: Takashi Soga, Saitama (JP)

(73) Assignee: Fujifilm Corporation, Tokyo (JP)

( * ) Notice: Subject to any disclaimer, the term of this patent is extended or adjusted under 35 U.S.C. 154(b) by 636 days.

(21) Appl. No.: 11/110,699

(22) Filed: Apr. 21, 2005

(65) Prior Publication Data

US 2005/0237383 A1 Oct. 27, 2005

(30) Foreign Application Priority Data

Apr. 22, 2004 (JP) ............................. 2004-127095

(51) Int. Cl.
*H04N 5/225* (2006.01)
*H04N 5/262* (2006.01)
*G06K 9/00* (2006.01)

(52) U.S. Cl. ............... 348/218.1; 348/239; 382/154

(58) Field of Classification Search ............... 348/218.1, 348/219.1, 239, 36
See application file for complete search history.

(56) References Cited

U.S. PATENT DOCUMENTS 5,689,611 A * 11/1997 Ohta et al. ............... 386/46
7,064,777 B2 * 6/2006 Yamazaki ............... 348/208.5
2001/0010546 A1 * 8/2001 Chen ............... 348/218
2002/0126890 A1 * 9/2002 Katayama et al. ............... 382/154

FOREIGN PATENT DOCUMENTS

JP 7-199321 A 8/1995
JP 11-88754 A 3/1999

* cited by examiner

*Primary Examiner*—Lin Ye
*Assistant Examiner*—Kelly L. Jerabek
(74) *Attorney, Agent, or Firm*—Birch, Stewart, Kolasch & Birch, LLP (57) ABSTRACT

A digital camera comprises an angular velocity detector for detecting angular velocity of a camera body in a yaw direction and a pitch direction. In capturing panoramic image, when movement of the camera body is detected, a system controller determines an image capturing interval based on the detected angular velocity in the yaw direction, and controls a CCD image sensor to perform plural times of image capturing at the determined image capturing interval. The system controller temporarily stores the captured image data for the plural images in a buffer memory, and controls an image signal processor based on the angular velocity in the pitch direction and the image-capturing interval so as to compose the image data for the plural images to form a single panoramic image.

7 Claims, 7 Drawing Sheets

DIGITAL CAMERA FOR CAPTURING A PANORAMIC IMAGE

BACKGROUND OF THE INVENTION

1. Field of the Invention

The present invention relates to a digital camera which can compose a panoramic image.

2. Description Related to the Prior Art

A camera which obtains a panoramic photograph by photographing plural images whose object fields are adjacent to each other is well known. Japanese Patent Laid-Open Publication No. 7-199321 discloses a film camera which has a posture detector for detecting posture of the camera body. The camera compares the posture of the camera body at the time of photographing a frame in the panoramic image photographing mode to the present posture of the camera, and displays the comparison result on a display provided in a viewfinder. The user takes the next photograph according to the displayed information on the viewfinder. The panoramic photograph is formed by arranging the plural photographs in sequence.

Japanese Patent Laid-Open Publication No. 11-88754 discloses a digital camera which sends image data for plural images obtained in the panoramic image capturing mode to a personal computer with image processing software which composes the image data for the plural images to create a single panoramic image.

However, in the Japanese Patent Laid-Open Publication No. 11-88754, the plural images cannot be composed within the digital camera. There is a demand for a camera in which plural captured images are composed so as to easily obtain a panoramic image.

SUMMARY OF THE INVENTION

An object of the present invention is to provide a digital camera which enables users to easily obtain a panoramic image.

In order to achieve the above object and other objects, a digital camera of the present invention comprises an angular velocity detector, a controller, a temporary memory and an image composition section.

The angular velocity detector detects an angular velocity of a camera body in a yaw direction and a pitch direction when the camera body is moving. The controller determines a continuous capturing interval based on the angular velocity in the yaw direction detected by the angular velocity detector and drives an image sensor to perform image capturing plural times according to the determined continuous capturing interval. The temporary memory temporarily stores image data for plural images obtained in the plural times of image capturing. The image composition section applies an image composite process to the image data stored in the temporary memory based on the angular velocity in the pitch direction detected by the angular velocity detector so as to compose the image data for the plural images to create panoramic image data for a single panoramic image.

It is preferable that the digital camera further comprises a lens driver for moving taking lens in an optical axis direction, and the controller controls the lens driver to move the taking lens to a position where distortion of the taking lens is minimized, and determines the continuous capturing interval based on a field angle of the taking lens at the minimized distortion position and the angular velocity of the camera body in the yaw direction.

It is preferable that the controller controls a shutter speed based on the angular velocity in the yaw direction and in the pitch direction so as to avoid blurring of the captured image.

It is preferable that the controller determines the continuous capturing interval such that adjacent image capturing fields for the plural times of image capturing are partly overlapped.

It is preferable that the controller controls the image composition section based on the angular velocity in the pitch direction and the continuous capturing interval to add the portions of image data by each pixel which corresponds to the overlapped portion of the image capturing fields so as to form the panoramic image data.

According to the present invention, the user has only to move the camera body, then the digital camera automatically determines the continuous capturing interval based on the angular velocity in the yaw direction and performs the plural image capturing at the determined continuous capturing interval so as to obtain the panoramic image. Accordingly, the user can easily obtain the panoramic image as compared with the conventional panoramic image capturing in which the user manually determines the plurality of image capturing fields. Further, since the captured image data for the plural images are composed within the digital camera, the user is free from a troublesome image composing operation.

Since the taking lens is set at the position where the distortion of the captured image is minimized in capturing the panoramic image, the image composing can be performed without distortion correction after image capturing. In addition, since the shutter speed is adjusted based on the angular velocity of the movement of the camera body, the digital camera can avoid blurring on the captured image.

BRIEF DESCRIPTION OF THE DRAWINGS

The above objects and advantages of the present invention will become easily understood by one of ordinary skill in the art when the following detailed description would be read in connection with the accompanying drawings.

FIGS. 7A and 7B are explanatory views showing an composing process of image data.

PREFERRED EMBODIMENTS OF THE INVENTION

Figure 1:
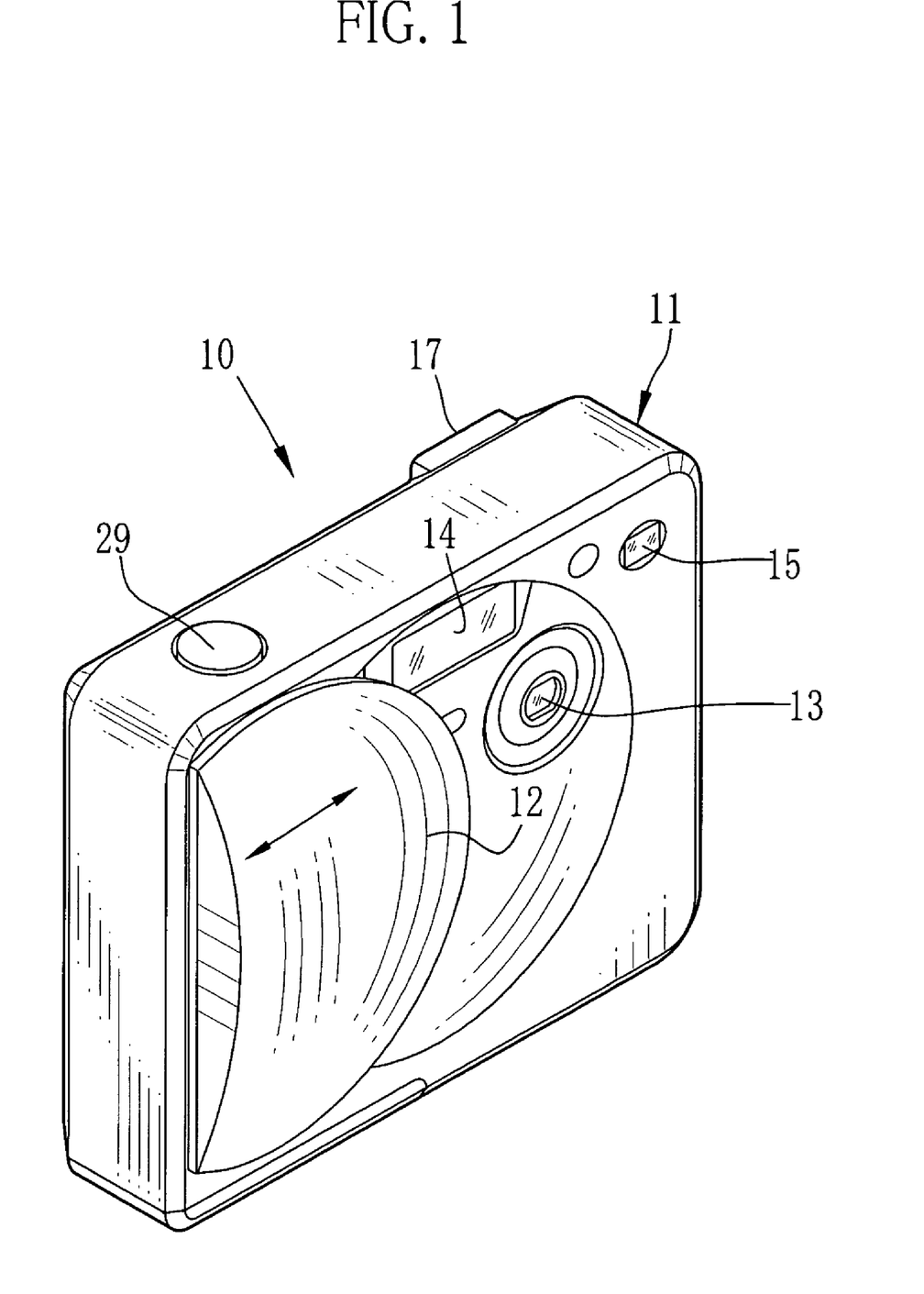
FIG. 1 is a front perspective view of a digital camera of the present invention.

As shown in FIG. 1, a digital camera 10 has a lens barrier 12, which is slidable in a direction shown as an arrow, on a front face of a camera body 11. When the lens barrier 12 is slid to an open position shown in FIG. 1, a taking lens 13 and a flashlight emitter 14 are exposed. The lens barrier 12 acts as a power switch. When the lens barrier 12 is slid to the open position, the digital camera 10 is powered on to capture images, and when the lens barrier 12 is slid to a shield position for shielding the taking lens 13 and the flashlight emitter 14, the digital camera 10 is powered off. In addition, an object-side viewfinder window 15 is provided on the front face of the camera body 11.

Figure 2:
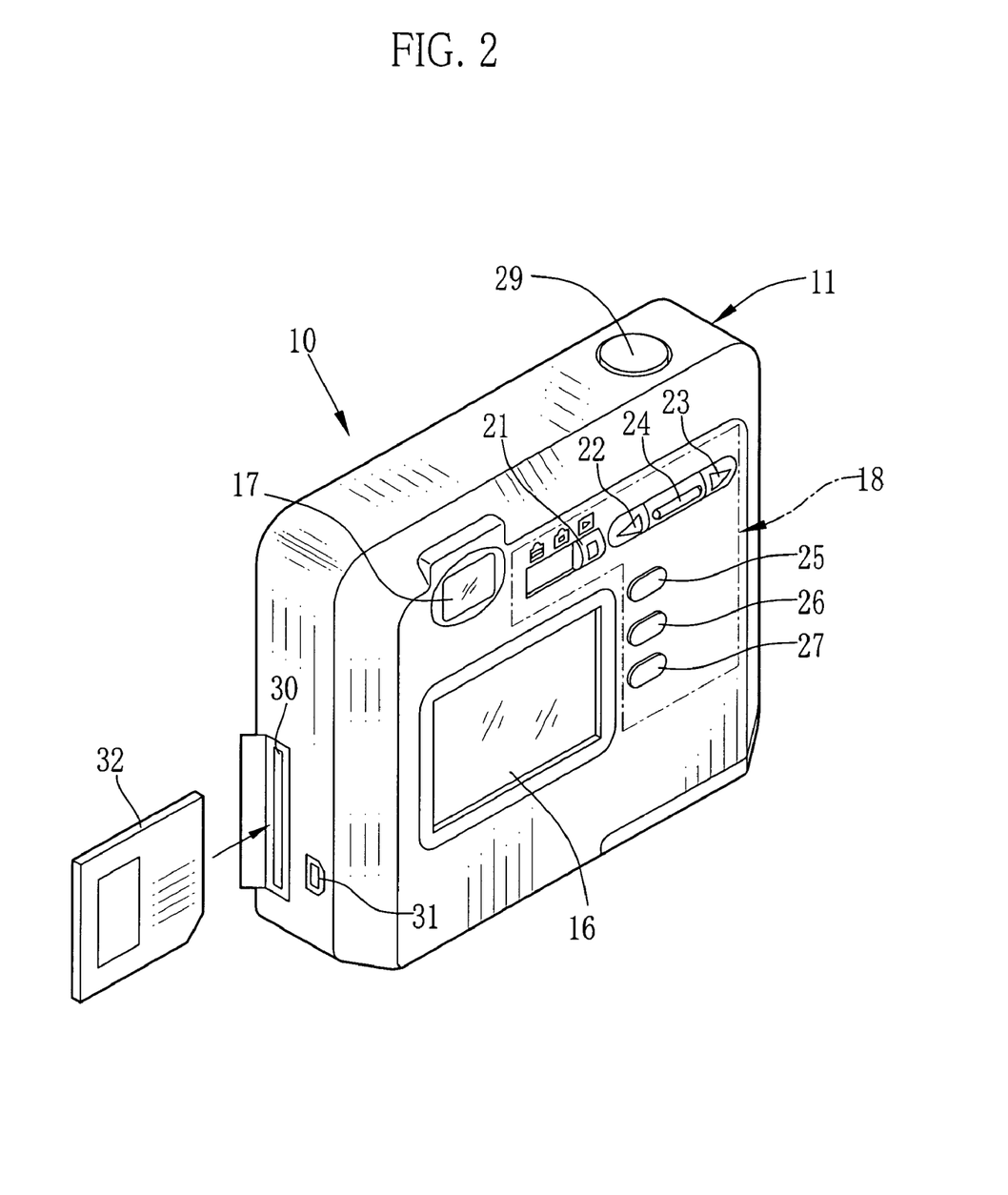
FIG. 2 is a rear perspective view of the digital camera.

As shown in FIG. 2, an LCD (liquid-crystal display) panel 16, an eye-side viewfinder window 17, and an operating section 18 including plural operating members operated by a user are provided on a rear face of the camera body 11. The LCD panel 16 displays the captured images and various setting screens. The LCD panel 16 is also used as an electronic viewfinder which displays a subject image in real-time.

The operating section 18 comprises a mode selector 21, a backward button 22, a forward button 23, a zoom button 24, a menu button 25, a cancel button 26, and a display button 27. The mode selector 21 is slid by the user to select one of an ordinary image capture mode, a panoramic image capture mode, and a playback mode. When the panoramic image capture mode is selected, a zoom position of the taking lens 13 is automatically adjusted to minimize a distortion of the taking lens 13. The forward button 23 and the backward button 22 are pressed for feeding the captured image forward and backward in the playback mode.

The zoom button 24 is pressed by the user upward and downward for moving the taking lens in an optical axis direction between a wide end and a tele end so as to change an image capture magnification. The menu button 25 is pressed by the user for displaying a menu screen on the LCD panel 16. The cancel button 26 is pressed for canceling various setting operations in the menu screen or for going back to the previous screen. The display button 27 is pressed by the user for turning ON/OFF the LCD panel 16.

A shutter button 29 is provided on a top face of the camera body 11. A stroke of the shutter button 29 has two steps. When the user presses the shutter button 29 halfway after framing in the LCD panel 16 or the optical viewfinder, a first switch (not shown) is turned ON so that various pre-imaging processes such as exposure control and focusing of the taking lens 13 are performed. After that, when the shutter button 29 is entirely pressed down, a second switch (not shown) is turned on so that the image is captured.

A memory card slot 30 and an external output terminal 31 are provided on a side face of the camera body 11. In the memory card slot 30, a memory card 32 as storage media in which the image data is recorded is inserted in a removable manner. The external output terminal 31 is a USB terminal or the like, which is used for outputting the image data recorded in the memory card 32 to an external apparatus such as a personal computer.

Figure 3:
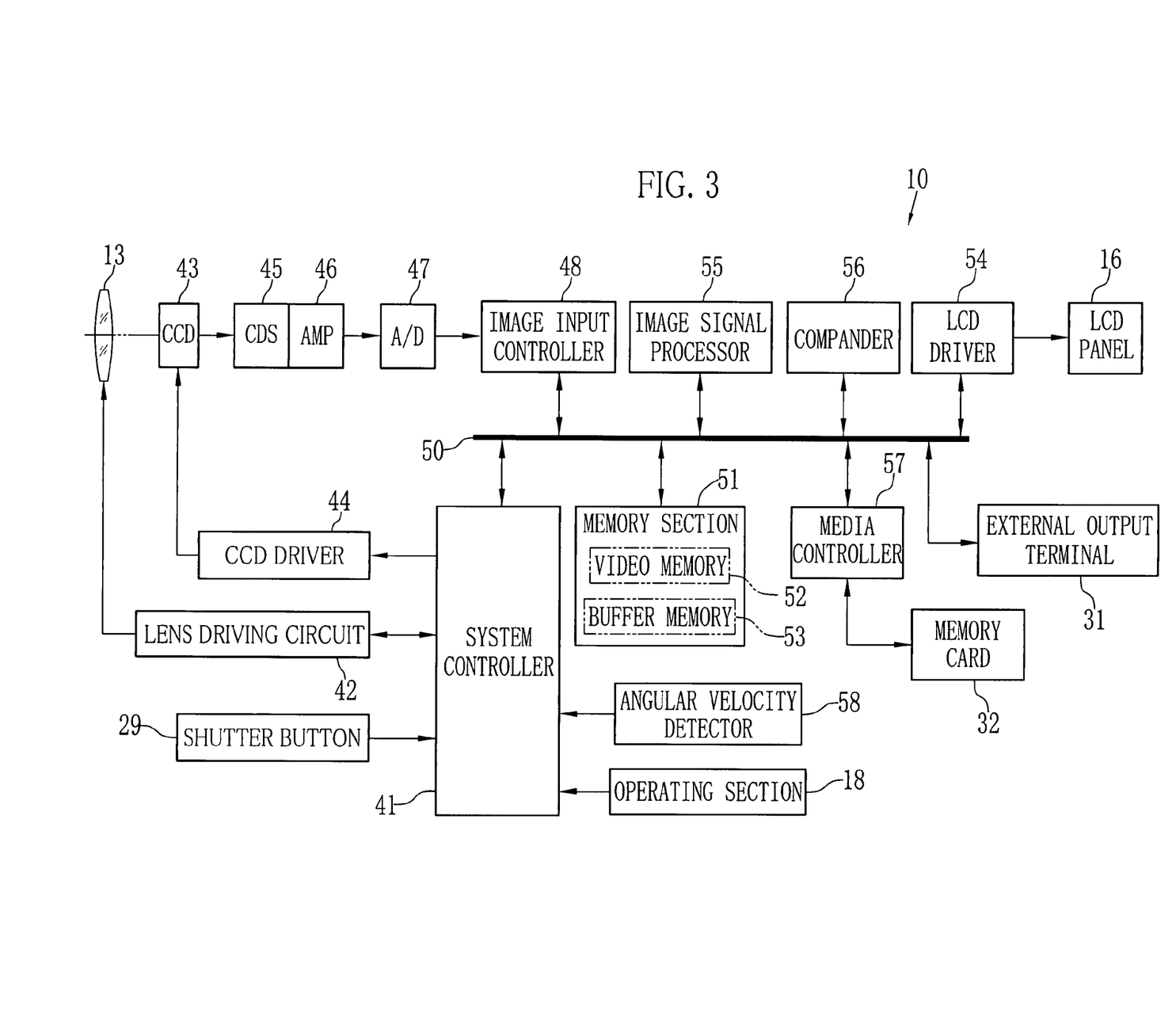
FIG. 3 is a block diagram showing an electronic construction of the digital camera.

As shown in FIG. 3, a system controller 41 is provided for controlling over the whole electronic components in the digital camera 10. The system controller 41 has a memory in which programs and data for controlling each of the electronic components are recorded.

The system controller 41 is connected to a lens driving circuit 42. The lens driving circuit 42 drives a motor (not shown) based on a command of the system controller 41 to move the taking lens 13 forward or backward in the optical axis direction, changing the image capture magnification and adjusting the focus of the taking lens 13. In addition, the system controller 41 obtains information on positions of the taking lens 13 (field angle) from the lens driving circuit 42 in the panoramic image capture mode. A CCD (charge-coupled device) image sensor 43 is provided behind the taking lens 13.

The CCD image sensor 43 is connected to the system controller 41 through a CCD driver 44. The system controller 41 controls the CCD driver 44 for driving the CCD image sensor 43 to photoelectrically convert the subject image to an electric signal and outputting the electric signal (image capture signal) to a CDS (correlation double sampling circuit) 45.

The CDS 45 removes noises from the analog image capture signal, and an AMP 46 amplifies the image capture signal. After that, the analog image capture signal is converted into a digital signal at an A/D converter 47, and is outputted to an image input controller 48 as image data.

The image input controller 48 is connected to the system controller 41 and a memory section 51 through a data bus 50. The system controller 41 controls the image input controller 48 to record the image data in the memory section 51. The memory section 51 has a video memory 52 and a buffer memory 53.

The video memory 52 temporarily memorizes low-resolution image data to be displayed in the LCD panel 16. The image data memorized in the video memory 52 is transmitted to an LCD driver 54 through the data bus 50. The LCD driver 54 performs signal processing to the image data and displays the image on the LCD panel 16.

The buffer memory 53 temporarily memorizes original high-resolution image data. An image signal processor 55 is connected to the system controller 41 through the data bus 50. The image signal processor 55 applies several image processing such as a gradation conversion, a color conversion, a hyper-tone processing and a hyper-sharpness processing to the high resolution image data in the buffer memory 53. The image signal processor 55 also works as an image composition section in which the image data for plural images recorded in the buffer memory 53 are composed to form panoramic image data for a single panoramic image in the panoramic image capture mode.

A compander 56, the External output terminal 31 and a media controller 57 are connected to the system controller 41 through the data bus 50. The compander 56 compresses the image data in the buffer memory 53 in a compression format such as JPEG. The system controller 41 controls the media controller 57 to store the compressed image data in the memory card 32. The compander 56 decompresses the compressed image data stored in the memory card 32 in playback.

Further, the shutter button 29, the operating section 18 and an angular velocity detector 58 are connected to the system controller 41. As stated above, the shutter button 29 has the first switch which is turned on by the halfway pressing, and the second switch which is turned on by the entirely pressing. The operating section 18 outputs the command signals regarding to the operations by the user to the system controller 41.

The angular velocity detector 58 has a gyro-sensor or the like to detect an angular velocity of the camera body 11 and output the angular velocity information to the system controller 41 when the camera body 11 is being rotated. More precisely, when the camera body 11 is being rotated in the yaw direction shown by an arrow in FIG. 4, the angular velocity detector 58 detects the angular velocity in the yaw direction and outputs the yaw direction angular velocity information to the system controller 41, and when the camera body 11 is being rotated in the pitch direction shown in an arrow in FIG. 5, the angular velocity detector 58 detects the angular velocity in the pitch direction and outputs the pitch direction angular velocity information to the system controller 41.

Figure 4:
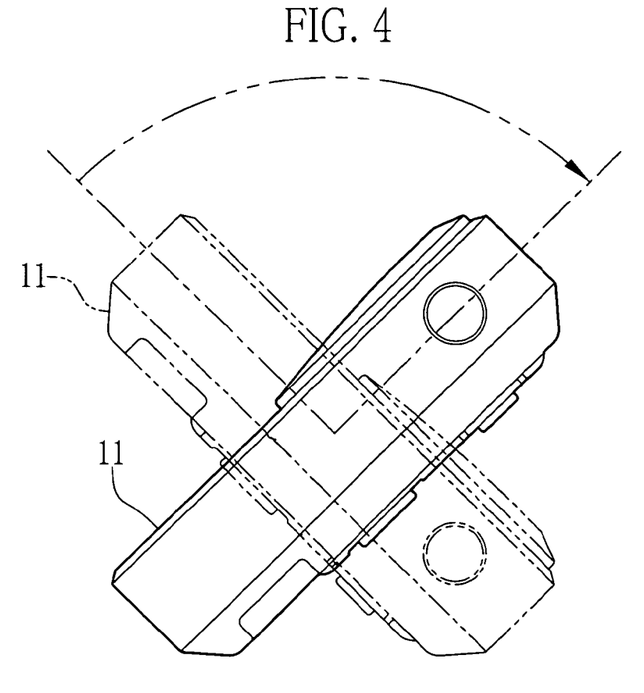
FIG. 4 is an explanatory view showing movement of a camera body in a yaw direction.
Figure 5:
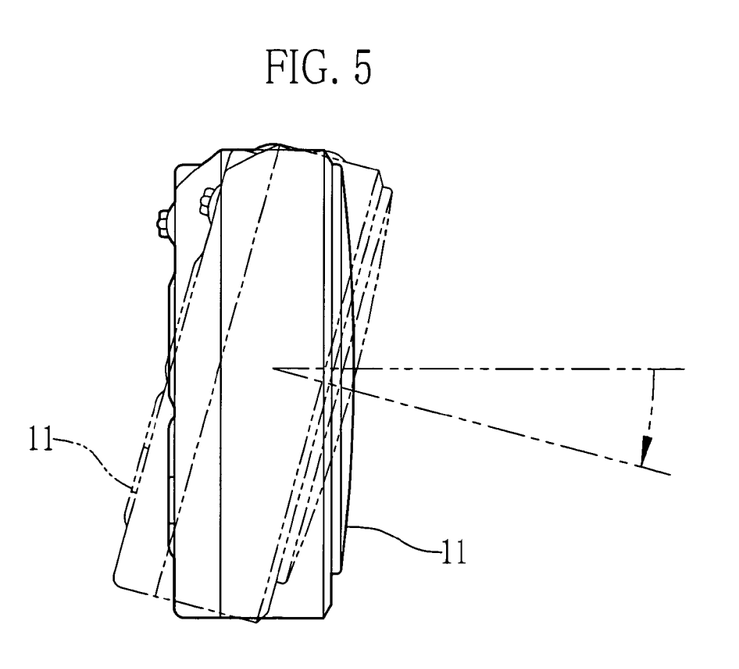
FIG. 5 is an explanatory view showing movement of the camera body in a pitch direction.

Note that the angular velocity detector 58 can detect the angular velocity in the yaw and pitch directions even if the camera body is moved in the opposite directions to the arrows in FIG. 4 and FIG. 5. Although the camera body 11 is rotated around its centerline in FIG. 4 and FIG. 5, the angular velocity detector 58 can also detect the angular velocity in the yaw and pitch directions when the camera body 11 is rotated around the user.

In the panoramic image capture mode, when the shutter button 29 is entirely pressed, the system controller 41 controls the CCD driver 44 to drive the CCD image sensor 43 so as to perform the first image capturing. After that, while the user is moving the camera body 11 in the yaw direction, the system controller 41 obtains the yaw direction angular velocity information from the angular velocity detector 58, and determines an image capturing interval (continuous capturing interval) based on the yaw direction angular velocity information and the position of the taking lens 13 (field angle). Until the user presses the shutter button 29 again, the system controller 41 drives the CCD image sensor 43 to automatically perform the continuous image capturing at the determined image capturing interval.

Figure 6:
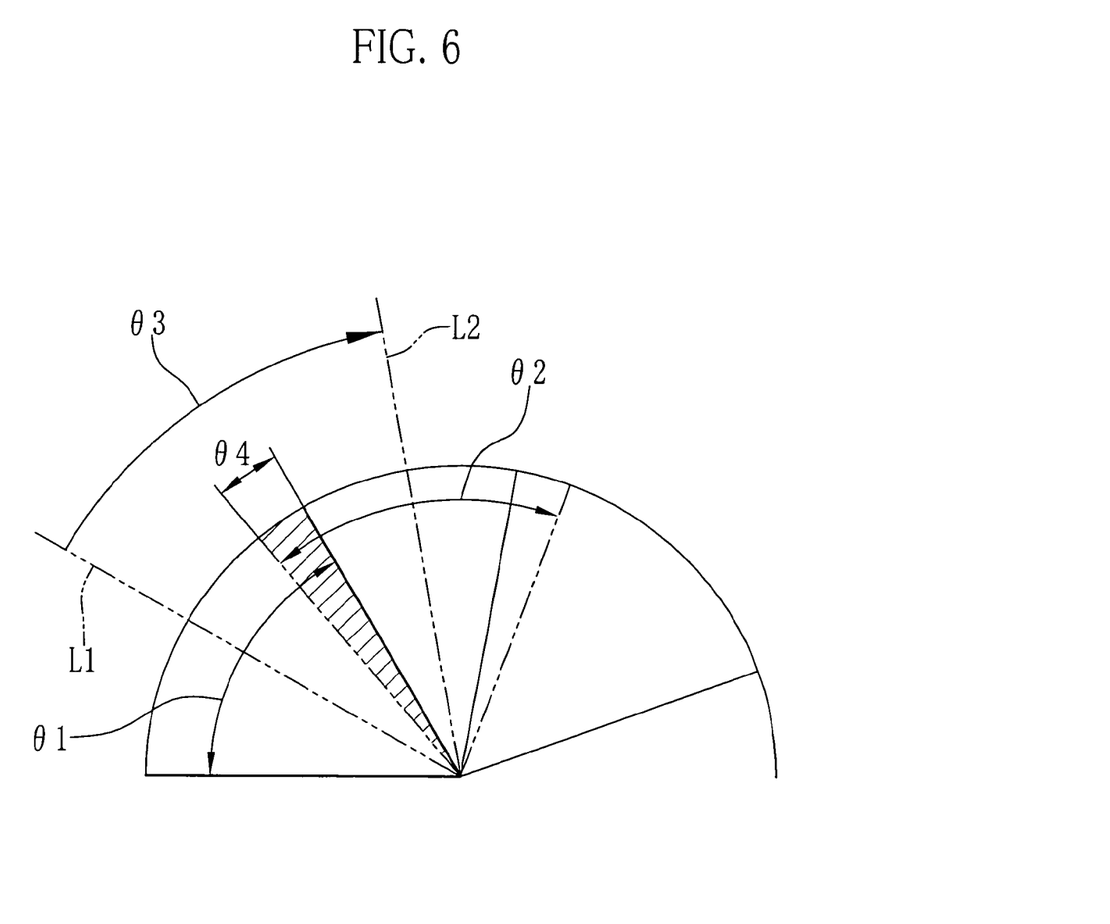
FIG. 6 is an explanatory view showing image capturing fields in panoramic image capturing.
Figure 7A:
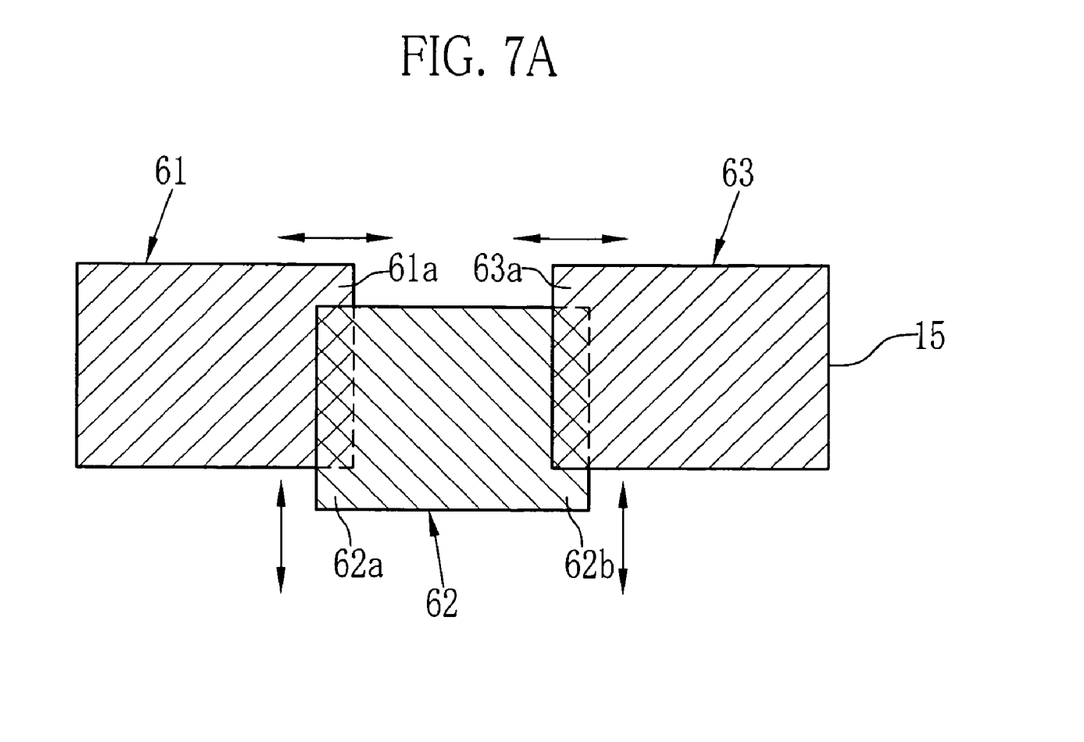
FIG. 7A shows movement of the images to be composed.
Figure 7B:
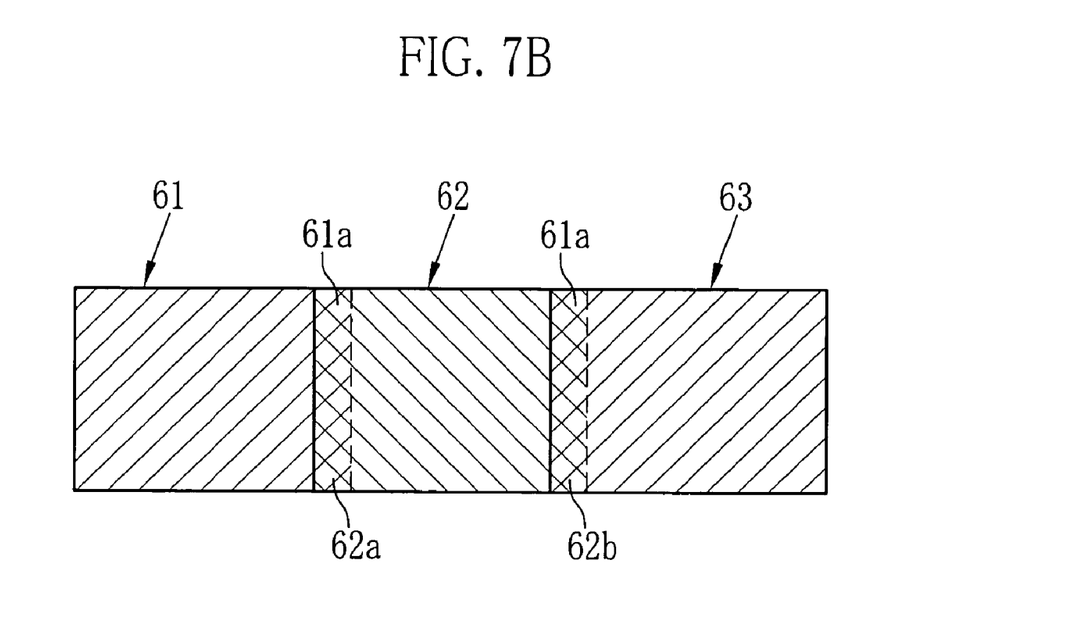
FIG. 7B shows a panoramic image formed by composing the plural images.

As shown in FIG. 6, the angles θ1 and θ2 of the adjacent image capturing fields are made to partly overlap. It means that an angle θ3 between a centerline L1 and a centerline L2 of the adjacent fields is determined such that the angles θ1 and θ2 are partly overlapped in an angle θ4. Accordingly, as shown in FIGS. 7A and 7B, three continuous images 61, 62, 63 have overlapping portions 61a, 62a, 62b, 63a in their lateral side ends.

The system controller 41 controls the CCD driver 54 such that the CCD image sensor 43 captures plural images at the determined image capturing interval and the image data for the plural images is stored in the buffer memory 53. Then, as shown in FIG. 7A, the system controller 41 controls the image signal processor 55 based on the image capturing interval to move the images 61, 62, 63 in a horizontal direction such that the overlapping portions 61a and 62a, 62b and 63a respectively coincide with each other in the horizontal direction. In addition, the system controller 41 obtains the pitch direction angular velocity information from the angular velocity detector 58 and controls the image signal processor 55 based on the pitch direction angular velocity information to move the images 61, 62, 63 in a vertical direction such that the overlapping portions 61a and 62a, 62b and 63a respectively coincide with each other in the vertical direction.

The images 61, 62, 63 are moved in the horizontal and vertical directions in this explanation. However, in practice, the image signal processor 55 applies the image processing to the images 61, 62, 63 so that the overlapping portions 61a and 62a, 62b and 63a respectively coincide with each other. Accordingly, the plural images are composed to form a panoramic image as shown in FIG. 7B.

Figure 8:
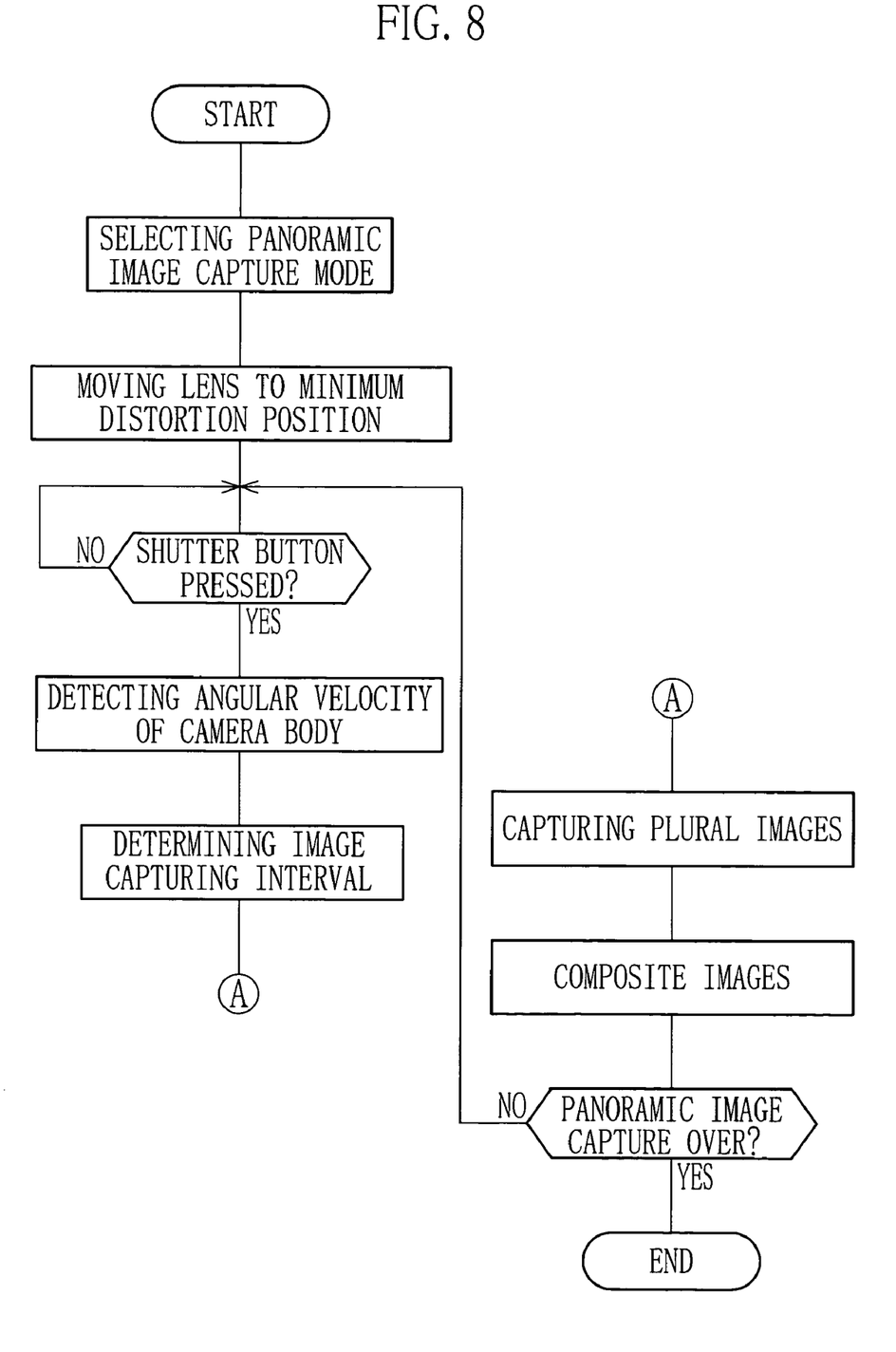
FIG. 8 is a flowchart showing a process of panoramic image capturing.

A process of the panoramic image capture with using the digital camera 10 is now described with reference to a flow chart in FIG. 8. When the user selects the panoramic image capture mode with operating the mode selector 21, the system controller 41 controls the lens driving circuit 42 to set the taking lens 13 in the position where the distortion of image is minimized.

Then the digital camera 10 becomes in a standby state. When the shutter button 29 is pressed, the system controller 41 controls the CCD driver 44 to drive the CCD image sensor 43 so as to perform the first image capturing. At the same time, the angular velocity detector 58 starts detecting the angular velocity of the camera body 11. While the user is moving the camera body 11, the angular velocity detector 58 detects the angular velocity of the camera body 11 in the yaw direction and the pitch direction, and outputs the angular velocity information to the system controller 41. The system controller 41 obtains the yaw direction angular velocity information from the angular velocity detector 58 and the zoom lens position of the taking lens 13 (field angle) from the lens driving circuit 42, and determines the image capturing interval based on the yaw direction angular velocity information and the field angle such that the two adjacent image capturing fields are partly overlapped as shown in FIG. 6.

The system controller 41 controls the CCD driver 44 to drive the CCD image sensor 43 to automatically perform some image capturing at the determined image capturing interval. Note that the number of image capturing is determined by the image capturing interval and a rotation angle of the camera body 11. In addition, when the image capturing is performed, the system controller 41 controls the CCD driver 44 to adjust a shutter speed of an electronic shutter based on the angular velocity information of both the yaw direction and the pitch direction, so as to avoid blurring the images. The iamge data for the plural images obtained in the image capturing is stored in the buffer memory 53. When the user lifts the finger off the release button 29, the image capturing is over.

The system controller 41 controls the image signal processor 55 to compose the image data for the plural images to form panoramic image data for a single panoramic image such that the adjacent overlapping portions of these images respectively coincide with each other as shown in FIG. 7B.

Then the system controller 41 controls the compander 56 to compress the panoramic image data, and controls the media controller 57 to write the compressed panoramic image data in the memory card 32.

After that, if the user operates the mode selector 21 to switch to the ordinary image capture mode or the playback mode from the panoramic image capture mode, or slides the lens barrier 12 to the shield position to power off the digital camera 10, the panoramic image capturing process is finished. If the user operates neither the mode selector 21 nor the lens barrier 12, the digital camera 10 becomes the standby state again until the shutter button 29 is pressed to start over the panoramic image capturing process again.

In the playback of the captured panoramic image, as same as the playback of the ordinary image data, the system controller 41 controls the media controller to read out the panoramic image data from the memory card and controls the compander 56 to decompress the panoramic image data. And then the system controller 41 controls the LCD driver 54 to display the panoramic image on the LCD panel 16.

In the above explanation, the camera body 11 is moved in the horizontal direction to perform the panoramic image capture. However, the camera body 11 may be moved in the vertical direction to perform the panoramic image capture.

The first image capturing may be started when the movement of the camera body 11 is detected after the shutter button 29 is pressed, and the automatic image capturing may be stopped when the movement of the camera body 11 is stopped. Also, the automatic image capturing may be stopped when the camera body is moved all the way across a predetermined angle.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A digital camera for forming image data by capturing a subject image focused on an image sensor through a talking lens, comprising:

an angular velocity detector for detecting an angular velocity of a camera body in a yaw direction and a pitch direction when said camera body is being moved;

a controller for determining a continuous capturing interval based on said angular velocity in said yaw direction detected by said angular velocity detector and driving an image sensor to perform image capturing plural times according to said determined continuous capturing interval;

a temporary memory for temporarily storing image data for plural images obtained by said plural times of image capturing;

an image composition section for applying an image processing to said image data stored in said temporary memory based on said angular velocity in said pitch direction detected by said angular velocity detector so as to compose said image data for said plural images to form panoramic image data for a single panoramic image; and a lens driver for moving taking lens in an optical axis direction, wherein said controller controls said lens driver to move said taking lens to a position where distortion of image is minimized, and determines said continuous capturing interval based on a field angle of said taking lens at said minimized distortion position and said angular velocity of said camera body in said yaw direction.

2. A digital camera as described in claim 1, wherein said controller controls a shutter speed based on said angular velocity in said yaw direction and in said pitch direction so as to avoid blurring said captured image.

3. A digital camera as described in claim 2, wherein said controller determines said continuous capturing interval such that adjacent image capturing fields in said plural times of image capturing partly overlap each other.

4. A digital camera as described in claim 3, wherein said controller controls said image composition section based on said angular velocity in said pitch direction and said continuous capturing interval to add up image data in said overlapping portion on a pixel basis so as to form said panoramic image data.

5. A digital camera as described in claim 1, further comprising a display for displaying a playback of a panoramic image based on said panoramic image data.

6. A digital camera as described in claim 1, further comprising an external memory attached in said camera body in a removable manner, in which said panoramic image data is recorded.

7. A digital camera as described in claim 1, further comprising a selector for selecting one of a panoramic image capture mode in which said panoramic image data is formed and an ordinary image capture mode in which said image data are not composed.

* * * * *